(12) United States Patent
Aygün

(10) Patent No.: US 8,864,142 B2
(45) Date of Patent: Oct. 21, 2014

(54) ADJUSTING DEVICE FOR SHRINK-FIT CHUCK TOOL HOLDER

(75) Inventor: Hakki Aygün, Göggingen (DE)

(73) Assignee: Guehring OHG, Albastadt (DE)

( * ) Notice: Subject to any disclaimer, the term of this patent is extended or adjusted under 35 U.S.C. 154(b) by 0 days.

(21) Appl. No.: 13/218,952

(22) Filed: Aug. 26, 2011

(65) Prior Publication Data

US 2012/0074655 A1 Mar. 29, 2012

Related U.S. Application Data

(63) Continuation of application No. PCT/DE2010/000287, filed on Mar. 16, 2010.

(30) Foreign Application Priority Data

| Mar. 17, 2009 | (DE) | 10 2009 013 646 |
| Jun. 5, 2009 | (DE) | 10 2009 023 999 |
| Sep. 4, 2009 | (DE) | 10 2009 040 173 |

(51) Int. Cl.
| B23B 31/117 | (2006.01) |
| B23B 31/02 | (2006.01) |
| B23Q 11/10 | (2006.01) |

(52) U.S. Cl.
CPC ........... B23B 31/028 (2013.01); *B23Q 11/1023* (2013.01); *B23B 31/1179* (2013.01)
USPC ............... 279/20; 279/102; 279/156; 279/158

(58) Field of Classification Search
CPC ............. B23B 31/028; B23B 31/1179; B23Q 11/1023

USPC ........ 279/20, 102, 103, 105.1, 133, 151, 156, 279/158
IPC ...................................................... B23B 31/117
See application file for complete search history.

(56) References Cited

U.S. PATENT DOCUMENTS

| 2,345,495 | A | * | 3/1944 | Onsrud | 279/103 |
| 2,470,218 | A | * | 5/1949 | McNamara | 279/20 |
| 2,726,872 | A | * | 12/1955 | Onsrud | 279/103 |
| 3,788,658 | A | * | 1/1974 | Benjamin et al. | 279/75 |
| 4,385,854 | A | * | 5/1983 | Miyakawa | 408/127 |
| 4,799,838 | A | * | 1/1989 | Kubo et al. | 409/234 |
| 5,137,289 | A | | 8/1992 | Bütikofer | |
| 5,340,242 | A | * | 8/1994 | Armbrust et al. | 407/11 |
| 5,746,436 | A | * | 5/1998 | Kulan et al. | 279/4.04 |
| 5,772,219 | A | * | 6/1998 | Vossen | 279/156 |
| 5,947,657 | A | * | 9/1999 | Lipohar et al. | 408/97 |
| 6,371,705 | B1 | * | 4/2002 | Gaudreau | 409/234 |

(Continued)

FOREIGN PATENT DOCUMENTS

| DE | 10218292 A1 * | 11/2003 | B23B 31/10 |
| DE | 10 2006 028408 | 10/2007 | |

(Continued)

*Primary Examiner* — Eric A Gates
(74) *Attorney, Agent, or Firm* — Burr & Brown, PLLC

(57) ABSTRACT

The invention relates to an adjusting device for axially supporting a shank tool in a shrink-fit chuck tool holder, comprising a leveling section on the side facing the shank tool to level out or at least reduce any changes in position and/or orientation of the shank tool which are due to shrinkage.

9 Claims, 11 Drawing Sheets

(56) References Cited

U.S. PATENT DOCUMENTS

| | | | |
|---|---|---|---|
| 6,390,482 B1 * | 5/2002 | Hanoch | 279/102 |
| 7,062,847 B2 * | 6/2006 | Haimer | 29/800 |
| 7,137,185 B2 * | 11/2006 | Voss et al. | 29/447 |
| 7,192,226 B2 * | 3/2007 | Unsworth | 409/136 |
| 7,192,228 B2 * | 3/2007 | Haenle et al. | 409/234 |
| 7,328,904 B2 * | 2/2008 | Schell et al. | 279/60 |
| 7,371,036 B2 * | 5/2008 | Buttau et al. | 409/234 |
| 7,607,207 B2 * | 10/2009 | Buttau et al. | 29/447 |
| 2003/0193148 A1 | 10/2003 | Haag | |
| 2009/0179368 A1 | 7/2009 | Haimer | |
| 2011/0070042 A1 * | 3/2011 | Saito et al. | 408/59 |

FOREIGN PATENT DOCUMENTS

| | | | | |
|---|---|---|---|---|
| GB | 2 084 908 | | 4/1982 | |
| GB | 2084908 A | * | 4/1982 | B23B 31/04 |
| JP | 60 191734 | | 9/1985 | |
| WO | 90/10517 | | 9/1990 | |
| WO | 2007/042020 | | 4/2007 | |

* cited by examiner

Prior art

ADJUSTING DEVICE FOR SHRINK-FIT CHUCK TOOL HOLDER

The present invention relates to an adjusting device for axially supporting a shank tool in a shrink-fit chuck tool holder according to the preamble of claim 1 and a shrink-fit chuck tool holder with such an adjusting device according to claim 17.

Shrink-fit chucks are characterised by a simple tool change, transmissions of high torques, a slim design and an inherently high rotational accuracy. The principle of this clamping technique is very simple. The clamping section comprises a hole for receiving the shank tool, wherein the diameter of this hole has an undersize with respect to the shank diameter of the tool. By heating the clamping section, e.g. by induction, the clamping section expands, so that the tool shank can be introduced into the receiving hole. By cooling the clamping section, the latter shrinks and thereby forms a high-strength frictionally engaged connection with the tool shank. As an axial support for the shank tool in the shrink-fit chuck, use is often made of a length adjusting screw, by means of which the axial position of the tool in the shrink-fit chuck can be adjusted in a stepless manner.

In the aforementioned heating and shrinking process, the dimensions of the clamping section change not only in the radial direction, but also in the axial direction. The effect of this is that the shaft tool introduced in the expanded state experiences during the shrinkage process not only a radial force, but also an axial force on account of the axial shortening of the clamping section and is consequently pressed against the length adjusting screw. When the stop face of the length adjusting screw and/or the shank end of the tool have flatness faults in the μ-range or the thread of the adjusting screw or the chuck does not run coaxially with the axis of rotation, part of the aforementioned axial force of the shrink-fit chuck via the tool onto the length adjusting screw may be converted into a radial force component at the end of the shank, so that the axis of the shank tool becomes tilted and/or offset with respect to the axis of rotation. Rotational inaccuracies arise, which are all the greater, the longer the tool.

The problem of the present invention, therefore, is to make available an adjusting device or, more precisely, a shrink-fit chuck tool holder which enables high rotational accuracy despite production-related faults in the tool or chuck.

This problem is solved by the features of claim 1 with regard to the adjusting device and by the features of claim 18 with regard to the shrink-fit chuck tool holder.

According to the invention, the adjusting device comprises a compensating section on the side facing the shank tool to compensate for or at least reduce changes in the position and/or orientation of the shank tool which are due to shrinkage. The adjusting device according to the invention is accordingly constituted such that it comprises a special section which can take up or compensate for the initially mentioned axial change in position of the shank tool and the associated axial force on the adjusting device and thus prevent the axial force from being converted into a radial force component. If this radial force component is absent or if it is kept to a minimum, tilting of the tool axis with respect to the axis of rotation of the shrink-fit chuck likewise does not occur. Through this compensating function of the adjusting device, the already very high inherent rotational accuracy of a shrink-fit chuck can be further improved, since the slightest flatness faults or coaxial deviations of the individual parts can be compensated for by means of the adjusting device.

Further advantageous developments of the adjusting device according to the invention are the subject-matter of the sub-claims.

If the compensating section has a lower hardness and/or elasticity than the shrink-fit chuck tool holder, the adjusting section and the shank tool, it can be ensured that the compensating section compensates for the changes in position and/or orientation due to shrinkage before the latter lead to stresses in the chuck or in the tool, which can have an effect on the rotational accuracy of the arrangement as a whole.

Furthermore, the compensating section should be dimensioned such that at least its axial extension is greater than the axial change in the position of the tool due to shrinkage. This thus ensures that the compensating section can take up the whole axial change in position and the associated axial force and prevents parts having flatness faults from meeting one another and being radially deflected.

An adjusting screw can be used as the adjusting section of the adjusting device according to the invention, so that length adjusting screws used according to the prior art can be used as a part of the adjusting device according to the invention and existing shrink-fit chuck systems can thus cooperate with the adjusting device according to the invention without design modification measures.

In order to keep the number of accessories for shrink-fit chuck systems as small as possible, it is advantageous if the adjusting section and the compensating section are constituted in one piece. A particularly straightforward connection of the two sections is one such that the compensating section is formed by a coated section of the adjusting section. For the coating, consideration can be given to all materials which, depending on the application and the materials used for the shrink-fit chuck shank tool and the adjusting section, are capable of ensuring the aforementioned compensating function. Aluminium and brass have proved to be particularly suitable materials. The materials used as the compensating section can optionally be connected to the adjusting section also in a different way, e.g. by soldering or gluing.

If the compensating section is constituted as a separate component, by means of which the shank tool can be supported indirectly on the adjusting section, this has the particular advantage that adjusting screws used hitherto can continue to be used and the adjusting device merely has to be supplemented by the compensating component according to the invention. Existing systems can thus be retrofitted at any time.

If the separate component is made from a plastically deformable material, the latter can be used only once or a few times, but the whole axial positional shift of the shank tool is taken up on account of the plastic deformation of this component, so that significant axial forces no longer act on the adjusting section after the plastic deformation. When an elastic component is used, the axial forces on the adjusting screw continue to be present on account of the compression of the elastic material, but this component can be used again many times, so that the tool can continue without simultaneous replacement of the compensating section.

As materials for the separate component, consideration can be given, besides the aforementioned materials, in particular to plastics and rubber which, on account of the wide range of material properties, can provide the desired compensating function for any application of the adjusting device according to the invention.

A spring element located in front of the adjusting section, especially a cup spring, can be used as a compensating section.

The changes in position and/or orientation of the tool due to shrinkage can be brought about not only by means of elastically or plastically deformable materials, but also by relative changes in position between adjusting section and compensating section. If the contact faces, via which the adjusting section and the compensating section rest against one another, are constituted convex and concave, this makes it possible for both parts to enter into any angular position with respect to one another and thus to compensate for any flatness faults of the shank end of the tool or coaxial errors of the adjusting device.

The adjusting section preferably comprises on the side facing the shank tool a spherical segment, which is accommodated in a correspondingly shaped concave recess of the compensating section. For the axial securing, an annular, radially inwardly extending projection of the compensating section engages in an annular groove of the adjusting section running around at the periphery. Particularly with a suitable selection of the surfaces lying adjacent to one another, tilting of the longitudinal axes of the adjusting section and the compensating section relative to one another is still enabled even in the presence of a fairly large compressive load.

To advantage, the adjusting device comprises at least one coolant channel so that the shank tool can be supplied with coolant. The adjusting device according to the invention thus creates the aforementioned compensating function without the coolant supply of the shank tool having to be dispensed with. Depending on the type of coolant supply, the compensating section can comprise, on the side facing the shank tool, a plane stop for the plane shank ends (conventional cooling) or a conical stop for conical shank ends (minimum quantity lubrication (MQL) cooling). The adjusting device according to the invention can thus be used independently of the type of coolant supply.

With regard to the shrink-fit chuck tool holder, the initially posed problem of the present invention is solved by the features of claim 17, wherein this tool holder comprises an adjusting device according to claim 1.

BRIEF DESCRIPTION OF THE FIGURES

In the figures.

DETAILED DESCRIPTION OF PREFERRED EMBODIMENTS

Figure 1:
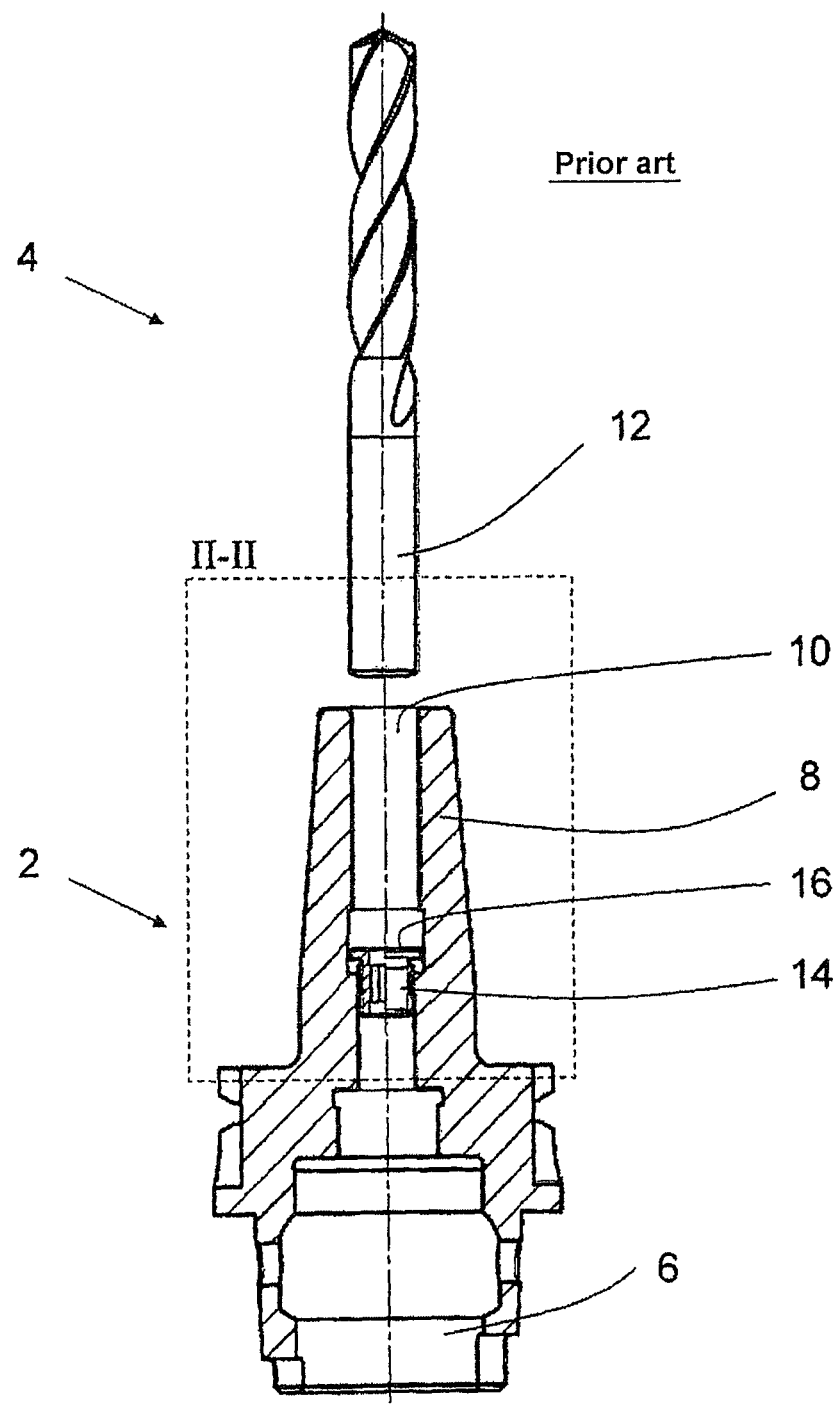
FIG. 1 shows a cross-sectional view of a shrink-fit chuck with a length adjusting screw according to the prior art with a shank tool to be clamped therein.

FIG. 1 shows a cross-section of a shrink-fit chuck 2 and a tool 4 to be clamped therein. The shrink-fit chuck has a fastening section 6 for fitting onto a tool machine (not shown) as well as a thermally expandable clamping section 8 with a hole 10 for receiving a cylindrical shank section 12 of tool 4. Also located in shrink-fit chuck 2 is a length adjusting screw 14, which acts as a stop for tool 4 and is disposed axially mobile in shrink-fit chuck 2.

Figure 2:
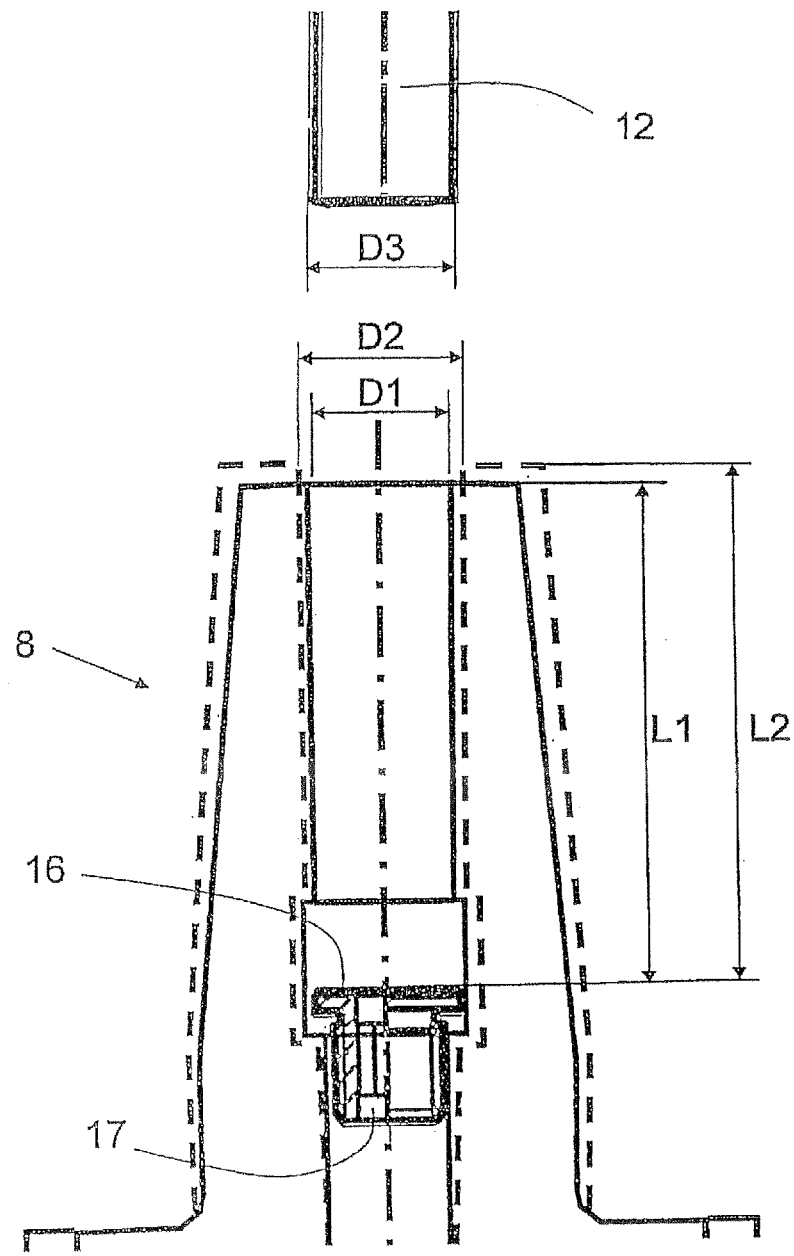
FIG. 2 shows the detail view II-II of FIG. 1.

FIG. 2 shows a detail view of a detail II-II in FIG. 1, wherein two states of clamping section 8 are shown. The continuous lines reproduce the dimensions of clamping section 8 in the cold state and the dashed lines the dimensions in the thermally expanded state. The thermal expansion can take place for example by means of an induction shrinkage device known from the prior art. Hole 10 has a diameter D1 in the cooled state and a diameter D2 in the thermally expanded state. Shank 12 of tool 4 has a diameter D3, which is greater than D1, but smaller than D2, so that shank 12 can be introduced into hole 10 in the expanded state of clamping section 8 and, after the cooling of clamping section 8, is gripped around radially by clamping section 8 in a non-positive and friction-locked manner, since clamping section 8 is endeavouring to reassume its original shape, in particular diameter D1.

It can also be seen from FIG. 2 that the axial extension of clamping section 8 also changes with respect to the stop face of length adjusting screw 14 on account of the thermal expansion. The distance from length adjusting screw 14 to the end of hole 10 thus amounts to L1 and in the heated state to L2. The effect of this is that, on account of the axial shrinkage of clamping section 8 from length L2 to length L1 during the shrinkage process, an axial force is applied to adjusting screw 14 via a frictional engagement between the inner wall of hole 10 and the surface of shank 12 of tool 4, said axial force having to be withstood by axially adjusted and fixed adjusting screw 14.

Figures 3A, 3B:
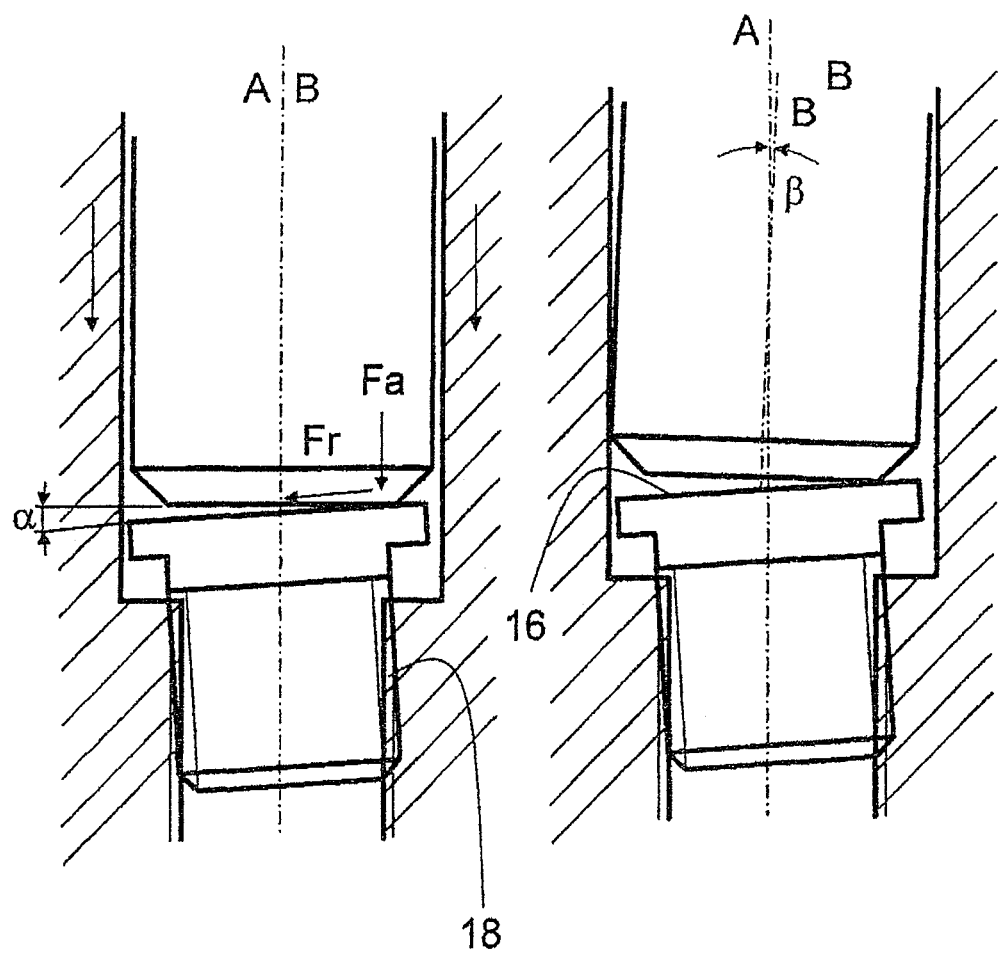
FIGS. 3A and 3B show a length adjusting screw with a shank end before and after the shrinkage process.

If, as shown in FIG. 3A, stop face 16 of length adjusting screw 14 does not lie normal to axis of rotation A, whether it be due to a flatness fault in the manufacture of stop face 16 or, as shown in FIG. 3A, due to a coaxial error of thread 18 of length adjusting screw 14 in shrink-fit chuck 2, the effect of this is that stop face 16 diverging at an angle α converts a part of axial force Fa into a radial component Fr and radially deflects shank end 12 on account of the not yet completely finished cooling process. When the shrink-fit chuck cools down further, tool longitudinal axis B can no longer align itself with respect to the axis of rotation, since axial force Fa continues to increase as the cooling process progresses and tool 4 is wedged in the position shown in FIG. 3B. It may therefore happen that longitudinal axis B diverges from axis of rotation A by an angle β, which can have a marked effect on the rotational accuracy of the tool over the length of tool 4.

Figures 4A, 4B:
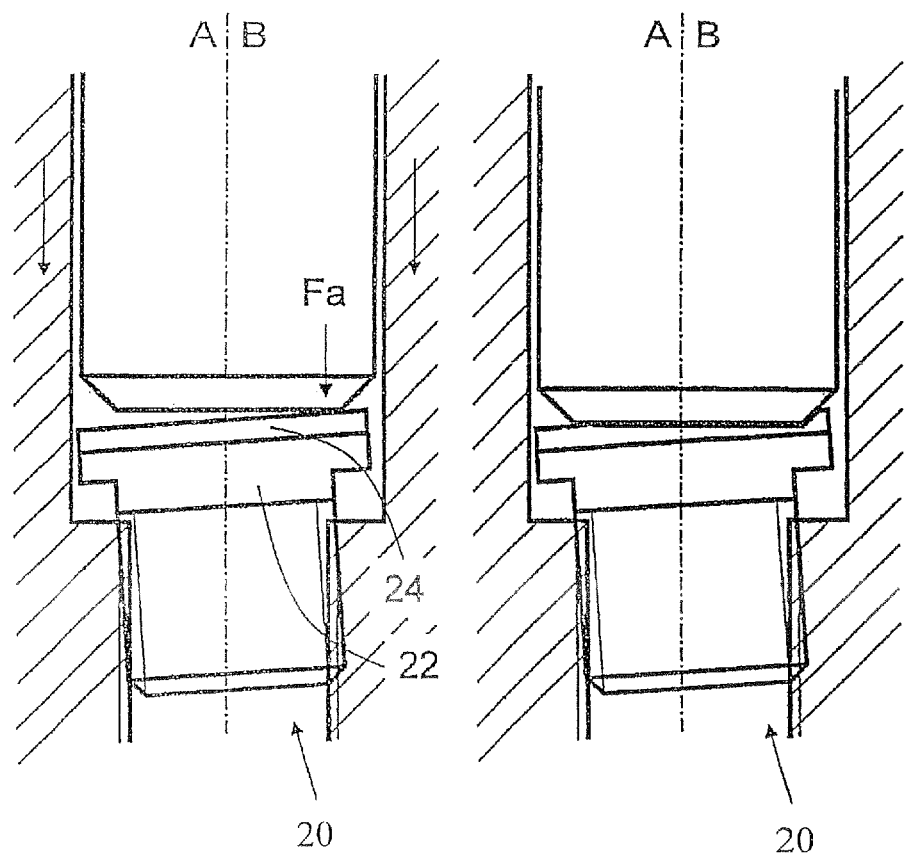
FIGS. 4A and 4B show an adjusting device and a shank end according to a first embodiment of the invention before and after the shrinkage process.

FIGS. 4A and 4B show an inventive adjusting device according to a first embodiment in the state before and after the shrinkage process. Adjusting device 20 comprises an adjusting section in the form of a length adjusting screw 22, which comprises a coating 24 on the side facing shank 12 of tool 4. The material of coating 24 is selected such that it is softer than length adjusting screw 22, shank 12 and the inner wall of hole 10, so that shank end 12 of tool 4 does not experience a radial deflection during the shrinkage-related axial displacement, since coating 12 takes up this axial displacement of tool 4. Since shank end 12 is not deflected radially, the coaxial state of tool axis B and axis of rotation A and therefore a high rotational accuracy is retained (see FIG. 4B).

Figure 5A:
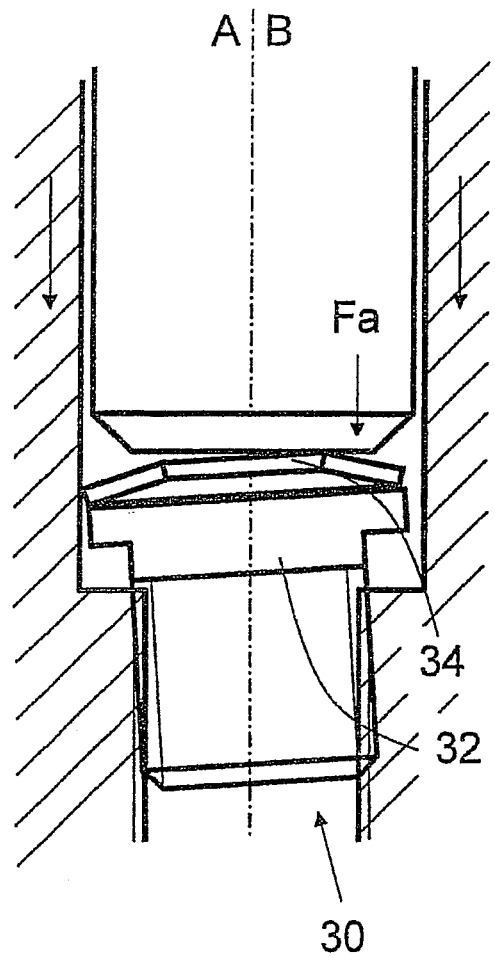
FIGS. 5A and 5B show an adjusting device and a shank end according to a second embodiment of the invention before and after the shrinkage process.
Figure 5B:
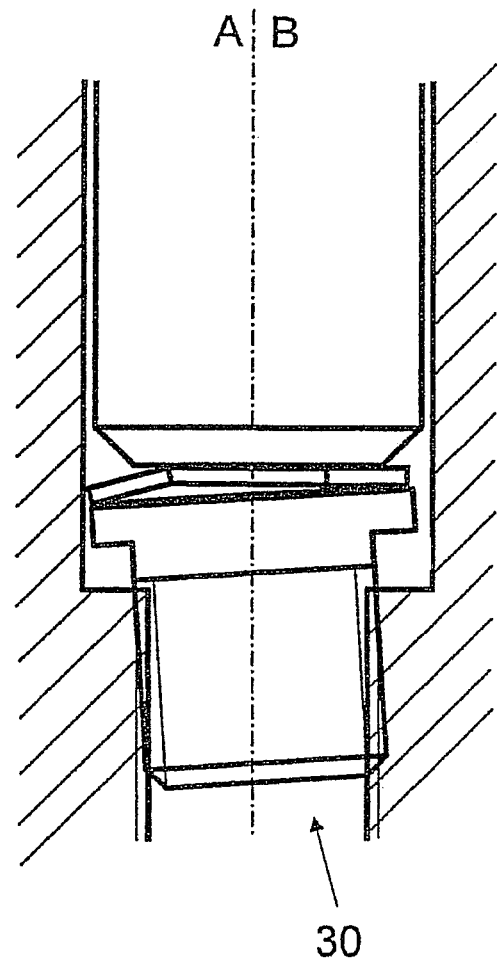

FIGS. 5A and 5B show an inventive adjusting device according to a second embodiment, wherein the compensating section is provided as a separate component. FIG. 5A shows an adjusting device 30 with a length adjusting screw 32, over which a spring element 34, e.g. a cup spring, is disposed. When shank end 12 is pushed axially in the direction of length adjusting screw 32 during the cooling and contraction of clamping section 8, spring element 34 becomes compressed and shank end is not radially deflected. Tool longitudinal axis B and axis of rotation A of shrink-fit chuck 2 therefore remain coaxial with one another, as is shown in FIG. 5B. Instead of the cup spring shown in FIG. 5, a disc made of rubber or elastic plastic can also be used as a spring element. Alternatively, a material can also be selected which becomes plastically deformed and can thus take up the axial displacement of tool 4.

Figure 6A:
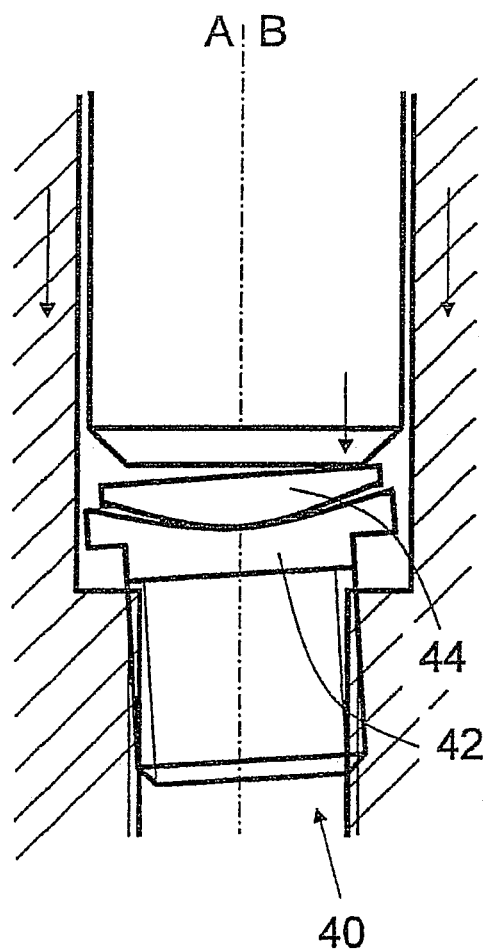
FIGS. 6A and 6B show an adjusting device and a shank end according to a third embodiment of the invention before and after the shrinkage process.
Figure 6B:
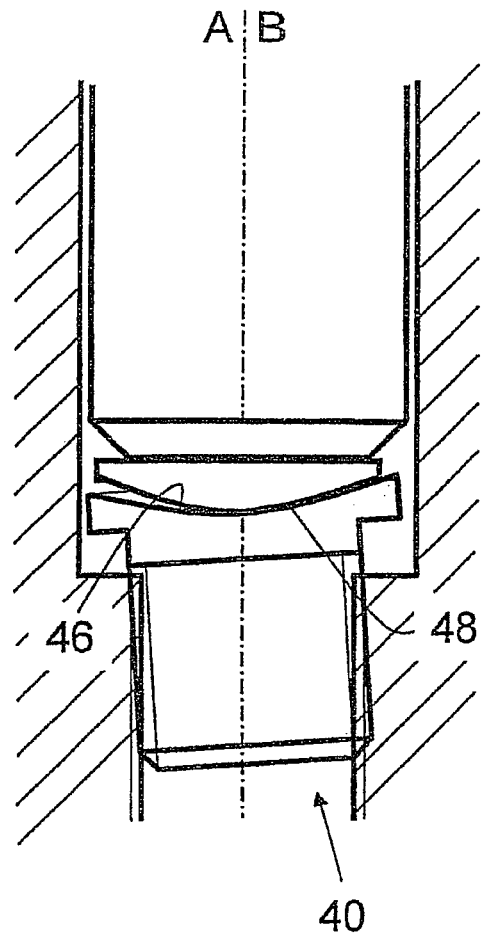

FIGS. 6A and 6B show an adjusting device according to a third embodiment of the invention. Adjusting device 40 again comprises a length adjusting screw 42, which cooperates with a compensating body 44, in such a way that any angular deviations between shank 12 and length adjusting screw 42 can be compensated for. On the side facing compensating body 44, length adjusting screw 42 comprises a concave face 46, in which a correspondingly convex-shaped surface 48 of compensating body 44 is accommodated, the two sliding against one another. Compensating body 44 is therefore capable, through tilting or relative displacement, of entering into the most varied angles with respect to length adjusting screw 42, in order in this way to orientate itself normal to axis of rotation A. It is of course also possible for length adjusting screw 42 to comprise a convex surface and compensating body 44 to comprise a concave surface, which correspondingly cooperate as described above. The arrangement according to the third embodiment of the invention is therefore also capable of compensating for changes in the position and orientation of the tool due to shrinkage, as can be seen in FIG. 6B.

Figure 7:
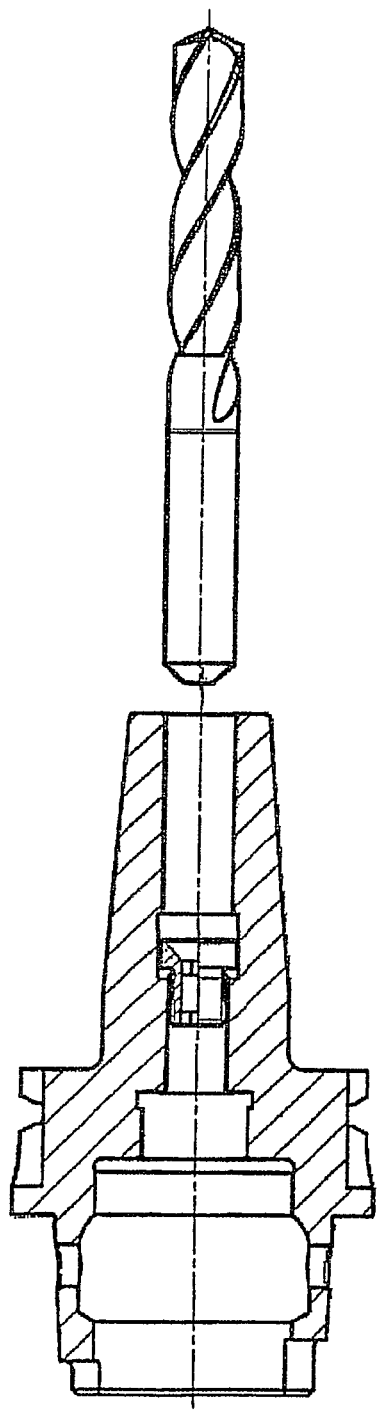
FIG. 7 shows a cross-section of view of a shrink-fit chuck with a length adjusting screw adapted for MLQ feeding with a conical stop and a shank tool with a conical shank end.

FIGS. 4 to 6 illustrate the adjusting device according to the invention in respect of a plane shank end, which is used with a conventional coolant supply. The adjusting device according to the invention can however also be used in a clamping chuck arrangement shown in FIG. 7, wherein tool 4 to be clamped comprises a conical shank end, which is used with minimum quantity lubrication (MQL) cooling. It should be noted that the compensating section, which in the case of the adjusting device according to the invention forms the interface with the tool shank end, comprises a specific conical shape for the MQL coolant supply and forms a radially outer sealing face with the conical end section of the tool shank.

Figure 8:
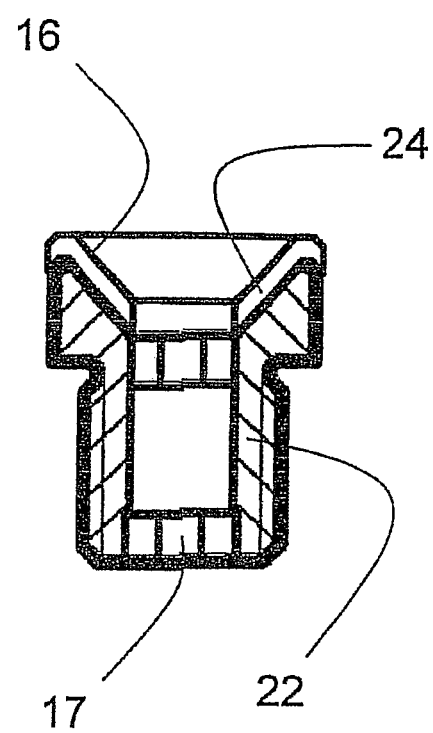
FIG. 8 shows a variant of the adjusting device according to the first embodiment.

A correspondingly modified variant of the adjusting device is shown by way of example for the first embodiment in FIG. 8.

Figure 9A:
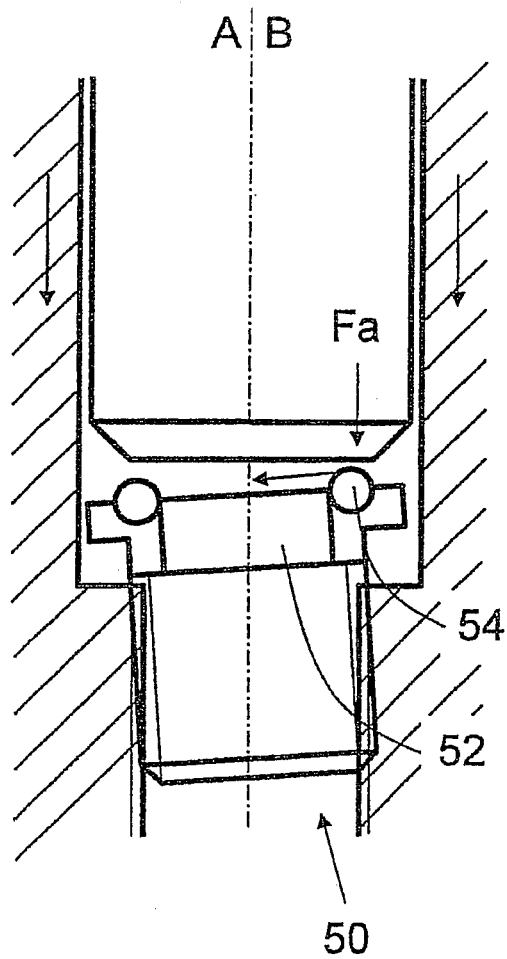
FIGS. 9A and 9B show an adjusting device and a shank end according to a fourth embodiment of the invention before and after the shrinkage process.
Figure 9B:
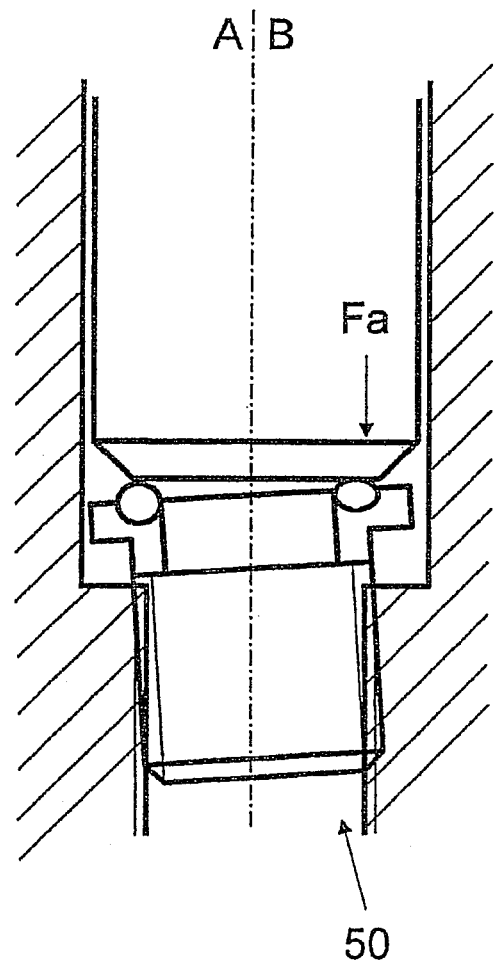

FIGS. 9A and 9B show an adjusting device according to a fourth embodiment of the invention, wherein the compensating section is constituted as a projecting O-ring 54 provided in a length adjusting screw 52, said O-ring being accommodated in a corresponding groove at the end face of length adjusting screw 52. When shank end 12 is pushed axially in the direction of length adjusting screw 52 during the cooling and contraction of clamping section 8, the O-ring becomes compressed and shank end 12 is not therefore radially deflected. Tool longitudinal axis B and axis of rotation A of shrink-fit chuck 2 therefore remain coaxial with one another, as is shown in FIG. 9B.

Figures 10A, 10B:
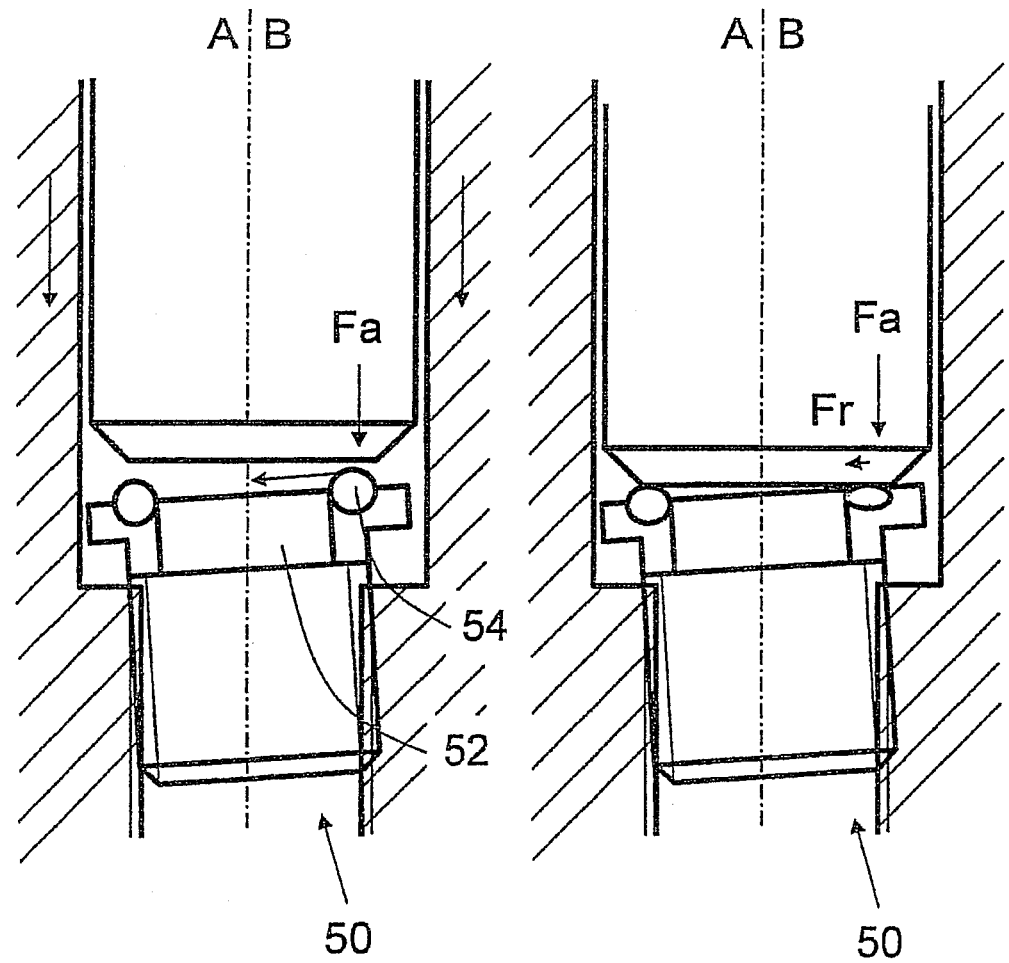
FIGS. 10A and 10B show an adjusting device and a shank end according to a fourth embodiment of the invention before and after the shrinkage process with a still remaining minimal radial force component.

If the O-ring cannot compensate for the whole shrinkage-related axial movement of clamping section 8, it may happen that shank end 12 compresses the O-ring in such a way it reaches the end face of length adjusting screw 52 and is minimally deflected radially, as is intended to be illustrated in FIG. 10B by the small arrow for force component Fr. Compared to an adjusting screw without a compensating section according to the invention (FIG. 10A), however, the radial force component is considerably reduced and kept within a tolerable range without a significant influence on the rotational accuracy of shank tool 4.

The comments made in respect of FIG. 10B naturally also apply to the other embodiments.

Figure 11:
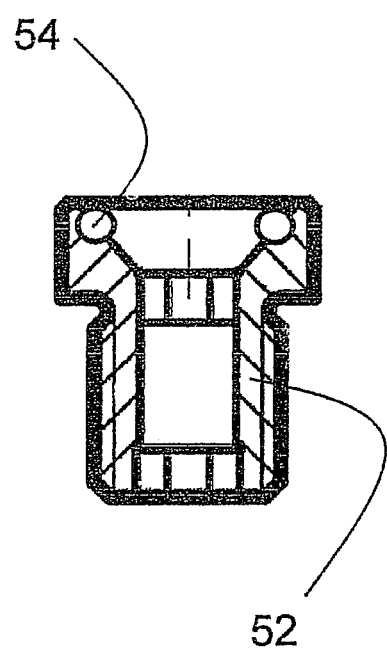
FIG. 11 shows a variant of the adjusting device according to the fourth embodiment.

FIG. 11 shows, like FIG. 8, an adjusting device according to the invention, which is particularly suitable for conical tool shank ends. O-ring 54 used for the length compensation is located in the conical section of length adjusting screw 52, so that the conical face of the tool shank end rests against the latter. O-ring 54 sits in a peripheral groove provided for this purpose in the conical section of length adjusting screw 52. However, it is also conceivable to introduce O-ring 54 loosely into the conical section, before the shank tool is introduced. Moreover, the comments made in respect of FIGS. 8, 9 and 10 apply.

Figures 12A, 12B:
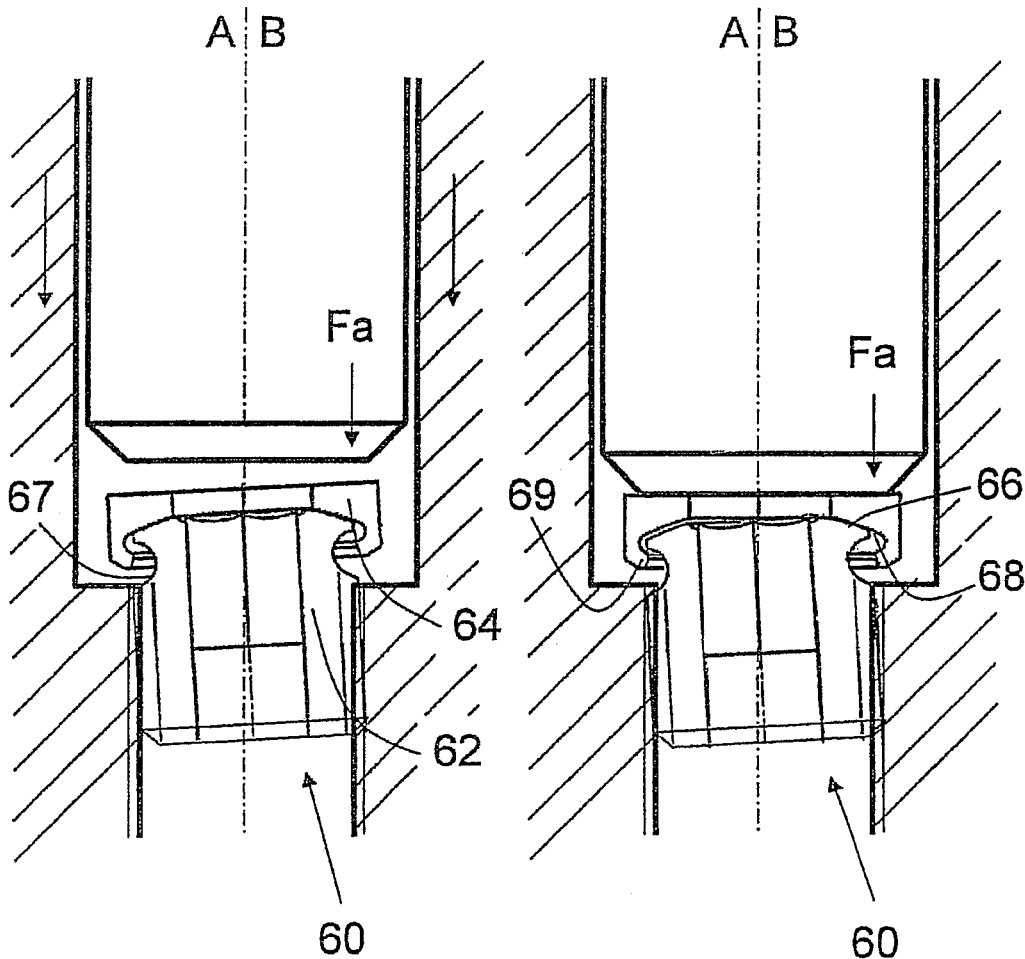
FIGS. 12A and 12B show an adjusting device and a shank end according to a fifth embodiment of the invention before and after the shrinkage process.

FIG. 12A and 12B show an adjusting device according to a sixth embodiment of the invention, which in terms of the functional principle is very similar to the third embodiment represented in FIGS. 6A and 6B. Adjusting device 60 again comprises a length adjusting screw 62, which cooperates with a compensating body 64, in such a way that any angular deviations between shank 12 and length adjusting screw 62 can be compensated for. Length adjusting screw 62 has a spherical segment 66 on the side facing compensating body 64 and a peripheral groove 67 running around at the periphery. Compensating body 64 comprises a correspondingly shaped concave recess 68 on the side facing length adjusting screw 62, in which recess spherical segment 66 is accommodated and lies adjacent over its surface. Furthermore, compensating body 64 comprises a peripheral, radially inwardly extending projecting section 69 which engages into groove 67 of length adjusting screw 62 by a predetermined amount which permits the assembly and dismantling of length adjusting screw 62 and compensating body 64. Compensating body 64 can thus be swivelled in any direction with respect to spherical segment 66 and is axially secured by the interaction of projection 69 and groove 67. Compensating body 64 and length adjusting screw 62 preferably comprise a passage for the coolant supply of tool 4.

The surfaces of spherical segment 66 and concave recess 68 sliding upon one another are constituted in such a way that, for example by selecting suitable materials and/or coatings with good sliding properties, it is ensured that compensating body 64 can still be swivelled with respect to length adjusting screw 62 even when compensating body 64 is pressed axially against spherical segment 66 of length adjusting screw 62 during the shrinkage process.

Thus, the arrangement according to the sixth embodiment of the invention is also capable of compensating for changes in the position and orientation of the tool due to shrinkage, as can be seen in FIG. 12B.

All the described embodiments of the invention also function when it is not the length adjusting screw, but rather the shank end that has a flatness fault or an axial error which, without suitable compensation by means of a coating, a spring element or a compensating body, would lead to the tilting of the tool in the shrink-fit chuck shown in FIG. 3B.

Furthermore, cooling channel 17 represented in FIG. 2 and run through the adjusting device (including the corresponding compensating section) has been omitted in FIGS. 3 to 6 and 9 solely for reasons of clarity of the representation.

The invention claimed is:

1. An adjusting device for axially supporting a shank tool in a shrink-fit chuck tool holder, the adjusting device comprising:
a compensating section on a side configured to face the shank tool to compensate for or at least reduce changes in the position and/or orientation of the shank tool which are due to shrinkage, the compensating section comprising an O-ring provided at an end face of the adjusting device, the end face comprising a groove, the groove having a first side and a second side, the second side opposing the first side, the O-ring being in the groove and projecting from the groove to beyond the end face, the shank tool supportable indirectly on the adjusting device by the O-ring.

2. The adjusting device according to claim 1, wherein the adjusting device comprises an adjusting section for the axial positioning in the shrink-fit chuck tool holder.

3. The adjusting device according to claim 1, wherein the compensating section has a lower hardness and/or greater elasticity than the shrink-fit chuck tool holder, the adjusting section and the shank tool.

4. The adjusting device according to claim 1, wherein the axial extension of the compensating section is greater than the axial change in the position of the tool due to shrinkage.

5. The adjusting device according to claim 4, wherein the adjusting section comprises an adjusting screw.

6. The adjusting device according to claim 4, wherein the compensating section is a separate, elastically or plastically deformable component, by means of which the shank tool can be indirectly supported on the adjusting section.

7. The adjusting device according to claim 6, wherein the separate component is a disc made of hard rubber or plastic.

8. The adjusting device according to claim 1, wherein the adjusting device comprises at least one coolant channel for supplying the shank tool with coolant.

9. A shrink-fit chuck tool holder for shank tools, comprising a fastening section for the connection to a tool machine, a thermally expandable shrink-fit section, which comprises an inner recess for the accommodation of a tool shank, and an adjusting device according to claim 1, which is disposed axially mobile in the inner recess and by means of which the axial position of the shank tool can be adjusted in the shrink-fit section.

\* \* \* \* \*